United States Patent
Gaal (10) Patent No.: US 8,619,884 B2
(45) Date of Patent: Dec. 31, 2013

(54) COMMUNICATION CHANNEL ESTIMATION

(75) Inventor: Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1732 days.

(21) Appl. No.: 11/386,530

(22) Filed: Mar. 21, 2006

(65) Prior Publication Data

US 2007/0053526 A1 Mar. 8, 2007

Related U.S. Application Data (60) Provisional application No. 60/713,995, filed on Sep. 2, 2005.

(51) Int. Cl.
*H04K 1/10* (2006.01)

(52) U.S. Cl.
USPC ........... 375/260; 375/229; 375/231; 375/232; 375/262; 375/265; 375/267; 375/295; 375/316; 375/340; 375/346; 375/347

(58) Field of Classification Search
USPC ......... 375/260, 229, 232, 262, 265, 267, 295, 375/316, 340, 343, 346, 347, 350; 370/203, 370/204, 205, 208, 209, 210
See application file for complete search history.

(56) References Cited

U.S. PATENT DOCUMENTS

| 5,796,814 | A | 8/1998 | Brajal et al. |
|---|---|---|---|
| 7,039,004 | B2 | 5/2006 | Sun et al. |
| 7,212,569 | B1 * | 5/2007 | Clark ............................. 375/233 |
| 7,218,666 | B2 | 5/2007 | Baum et al. |
| 7,301,993 | B2 | 11/2007 | Ibrahim et al. |
| 7,388,910 | B2 * | 6/2008 | McKown ....................... 375/232 |
| 7,406,140 | B2 * | 7/2008 | Kunieda et al. ................ 375/346 |
| 7,486,726 | B2 | 2/2009 | Alexander et al. |
| 7,617,099 | B2 | 11/2009 | Yang et al. |
| 2004/0017846 | A1 | 1/2004 | Fernandez-Corbaton et al. |
| 2004/0066773 | A1 | 4/2004 | Sun et al. |
| 2004/0123339 | A1 | 6/2004 | Conner et al. |
| 2004/0165650 | A1 | 8/2004 | Miyazaki et al. |
| 2004/0179483 | A1 * | 9/2004 | Perlow et al. .................. 370/278 |
| 2004/0213339 | A1 | 10/2004 | Smee et al. |
| 2007/0195864 | A1 * | 8/2007 | Jonsson et al. ................ 375/148 |
| 2007/0223565 | A1 | 9/2007 | Gaal |

FOREIGN PATENT DOCUMENTS

DE 10111496 9/2002

(Continued)

OTHER PUBLICATIONS

International Search Report—PCT/US06/034369—International Search Authority, European Patent Office—May 31, 2007.

(Continued)

*Primary Examiner* — Dhaval Patel
(74) *Attorney, Agent, or Firm* — S. Hossain Beladi; Ashish L. Patel (57) ABSTRACT

A channel estimator is configured to determine channel estimate parameters indicative of characteristics of a wireless communication channel based on a received signal comprising a known transmitted signal and a noise signal. The channel estimator is configured to apply, to the received signal, a frequency domain representation inverse of a combination of a known signal factor as a function of frequency and a noise factor.

67 Claims, 6 Drawing Sheets

(56) References Cited

FOREIGN PATENT DOCUMENTS

| | | | |
|---|---|---|---|
| JP | 2004104790 A | 4/2004 | |
| JP | 2004253899 A | 9/2004 | |
| JP | 2004266814 | 9/2004 | |
| JP | 2005130485 A | 5/2005 | |
| RU | 2110159 | 4/1998 | |
| RU | 2235430 | 8/2004 | |
| TW | 200412757 | 7/2004 | |
| WO | 0060762 | 10/2000 | |
| WO | WO0156239 A2 | 8/2001 | |
| WO | WO03101065 A1 | 12/2003 | |
| WO | WO2004010603 A2 | 1/2004 | |
| WO | 2004075499 | 9/2004 | |
| WO | 2004093366 | 10/2004 | |
| WO | WO2005020458 | 3/2005 | |
| WO | WO2005074224 | 8/2005 | |
| WO | 2006105307 | 10/2006 | |

OTHER PUBLICATIONS

Written Opinion—PCT/US06/034369—International Search Authority, European Patent Office—May 31, 2007.

International Preliminary Report on Patentability—PCT/US06/034369—The International Bureau of WIPO, Geneva, Switzerland—Mar. 4, 2008.

European Search Report—EP10180192, Search Authority—Munich Patent Office, Dec. 13, 2010.

Jiang Y. et al. "Maximum Likelihood Slow Frequency-Selective Fading Channel Estimation Using Frequency Domain Approach" CSHCN Technical Research Report. Published Nov. 27-Dec. 1, 2000.

Taiwanese Search Report—No. 095132370—TIPO, Feb. 6, 2010.

Translation of Office Action in Japan application 2008-529346 corresponding to U.S. Appl. No. 11/386,530, citing US20040123339, JP2004253899, US20040066773, JP2004266814 and JP2004104790 dated Mar. 8, 2011.

\* cited by examiner

COMMUNICATION CHANNEL ESTIMATION

CLAIM PRIORITY UNDER 35 U.S.C. §119

The present Application for Patent claims priority to Provisional Application No. 60/713,995 entitled "MEMO ON IMPROVED CHANNEL ESTIMATION ALGORITHM" filed Sep. 2, 2005, and assigned to the assignee hereof and hereby expressly incorporated by reference herein.

BACKGROUND

1. Field

The present invention relates generally to communication systems and more specifically to generating a channel estimate.

2. Background

Receivers in wireless communication systems often utilize channel compensators that filter or otherwise process a received signal to undo effects of the wireless communication channel on the signal. A wireless communication channel often has scattering and multi-fading channel characteristics resulting in multiple versions of the signal arriving at the access terminal device at different times. Channel compensators process the signal before demodulation of the received signal. In code division multiple access (CDMA) systems, for example, the received signal is processed by a linear equalizer that at least partially compensates for the wireless channel characteristics before the signal is demodulated. Conventional channel estimators, however, are limited in providing imperfect channel estimates that do not maximize the equalizer function's performance. In particular, conventional channel estimators can not provide an adequately accurate channel estimate for use with a decision feedback equalizer (DFE).

Therefore, there is a need for an improved channel estimator.

SUMMARY

A channel estimator is configured to determine channel estimate parameters indicative of characteristics of a wireless communication channel based on a received signal comprising a known transmitted signal and a noise signal. The channel estimator is configured to apply, to the received signal, a frequency domain representation inverse of a combination of a known signal factor as a function of frequency and a noise factor.

DETAILED DESCRIPTION

A channel estimator determines a channel estimate of a wireless communication channel based on a signal received through the wireless channel. The received signal includes at least a known transmitted signal and noise. In the exemplary embodiment, the channel estimator includes a channel analyzer that determines channel parameters and a non-path channel adjuster that determines noise reduction parameters. A parameter processor combines the channel parameters and the noise reduction parameters to generate a channel estimate that can be applied in a linear equalizer or decision feedback equalizer (DFE) used to process received signals. The channel analyzer applies, to the received signal, a reverse equalizer function that includes an inverse of a combination of a known signal factor and a noise factor when represented in the frequency domain. The non-path channel adjuster determines noise reduction parameters that when applied as part of the channel estimate, result in at least partially reducing the channel estimate within time delay widows between identified signal path delays. A searcher detects time-delayed versions of a pilot signal to identify the relative time delays between signal paths from the base station to the receiver. A windowing filter determines the appropriate noise reduction parameters to apply in the parameter processor that result in the at least partial reduction of the channel estimate within the time windows between the identified signal paths.

The word "exemplary" is used herein to mean "serving as an example, instance, or illustration." Any embodiment described herein as "exemplary" is not necessarily to be construed as preferred or advantageous over other embodiments.

Figure 1:
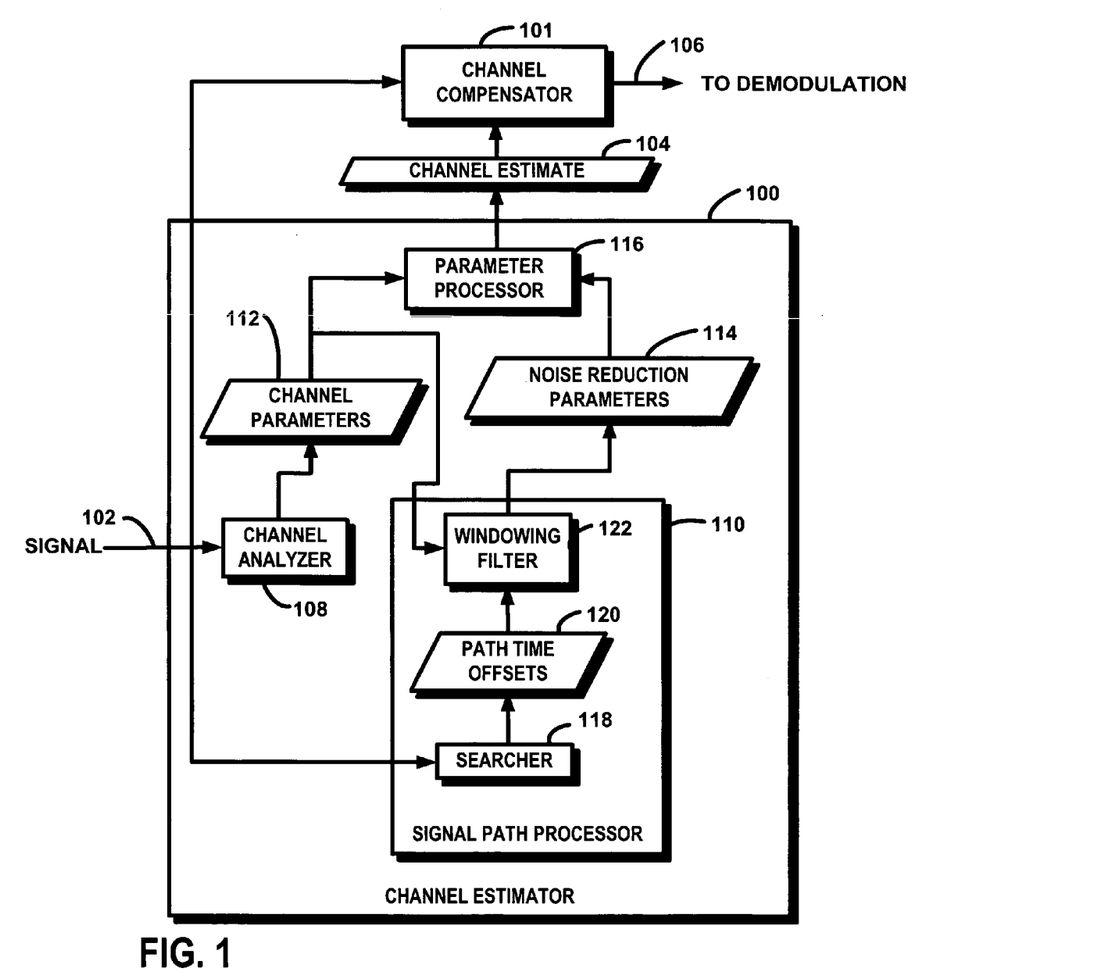
FIG. 1 is a block diagram of a channel estimator in accordance with the exemplary embodiment.

FIG. 1 is a block diagram of a channel estimator 100 connected to a channel compensator 101 in accordance with the exemplary embodiment of the invention. The channel estimator 100 may be implemented in any combination of hardware, software and/or firmware. In the exemplary embodiment, software code running on a processor within an access terminal such as cellular handset, or other portable communication device, executes the calculations, comparisons, and adjustments to perform the functions of the channel estimator 100. The various functions and operations of the blocks described with reference to the channel estimator 100 may be implemented in any number of devices, circuits, or elements. Two or more of the functional blocks may be integrated in a single device and the functions described as performed in any single device may be implemented over several devices in some circumstances. For example some of the functions of the searcher 118 may be performed by the channel analyzer in some circumstances. Depending on the particular implementation, some of the signals may be processed in the time domain or in the frequency domain. The channel estimator 100 in the exemplary embodiment includes other functions and blocks that are omitted in FIG. 1 in the interest of brevity and clarity.

The channel estimator 100 generates a channel estimate 104 that is used by a channel compensator 101, such as a linear equalizer or a decision feedback equalizer, to process signals transmitted from a base station and received through a wireless communication channel. The resulting compensated signal 106 is forwarded to a demodulator in the receiver for further processing. The channel estimate 104 is a function of frequency and may include any combination of parameters, variables and/or constants that can be applied by the channel compensator 101 to reduce the negative effects of the wireless communication channel. For example, the channel compensator 101 may remove noise and manipulate the received signal 102 to combine multiple time delayed versions of the incoming signal 102. An example of a suitable channel compensator includes a DFE discussed in U.S. patent application Ser. No. 11/386,534, filed on Mar. 21, 2006, entitled "Decision Feedback Equalizer For Code Division Multiplexed Signals," which is incorporated by reference in its entirety herein.

The channel estimator 100 includes a channel analyzer 108 and a signal path processor 110 in the exemplary embodiment. In some circumstances, however, the signal path processor 110 or the channel analyzer 108 may be omitted. Further, other techniques for generating the channel parameters 112 may be used with the signal path processor 110 to generate the channel estimate 104. The incoming received signal 102 is received at the channel compensator 101, the channel analyzer 108 and the signal path processor 110.

The channel analyzer 108 applies a reverse equalization function to the received signal to determine channel parameters 112 indicative of the wireless communication channel characteristics. Although the reverse equalization function is discussed with reference to a representation in the frequency domain, the channel analyzer 108 may perform processing in the time domain. For example, the channel analyzer 108 response may be designed in the frequency domain but implemented in the time domain in some circumstances. Those skilled in the art will recognize that various time-to-frequency domain and frequency-to-time domain transformations and frequency domain processing may be combined and processed in the time domain. The reverse equalization function, when represented in the frequency domain, includes an inverse of the combination of a known signal factor and a noise factor. Accordingly, the channel parameters 112 generated by the channel analyzer 108 are based partly on the signal to noise ratio (SNR) of the reference signal, such as the pilot signal, used by the channel analyzer 108. The frequency components in which the reference signal has a high SNR are emphasized by the channel analyzer 108 when determining the channel parameters 112. Conversely, the frequency components in which the reference signal has a low SNR are de-emphasized by the channel analyzer 108 when determining the channel parameters 112. An exemplary channel analyzer 108 is discussed in further detail with reference to FIG. 2.

The signal path processor 110 generates noise reduction parameters 114 that at least partially reduce the amplitude of the channel parameters 112 within filtered time windows when applied by the parameter processor 116. When applied to the channel parameters, the noise reduction parameters result in a channel estimate that reflects the filtered time windows resulting in reduced noise when applied by the channel compensator 101. Accordingly the noise reduction parameters 114 result in reduced noise in the compensated signal 106 by providing information related to the likelihood of signal paths existing at particular delays. A searcher 118 identifies relative time delays between signals paths by detecting time-offset versions of a known signal such as pilot signal. Although the searcher 118 is implemented in the frequency domain in the exemplary embodiment as discussed below, the searcher 118 may be implemented in the time domain in some circumstances. The searcher 118 generates a description of the signal paths that includes at least the path time offsets 120 between the signal paths. In the exemplary embodiment, time offsets from a reference signal path, such as the signal path with the least delay, are stored in memory with an associated amplitude and phase for the signal path. Accordingly, the searcher 118 creates a table of signal path time offsets with corresponding amplitudes and phases. A suitable technique for determining path time offsets 120 is discussed below with reference to FIG. 6. A windowing filter 122 determines filtered windows between the identified path time offsets that should be filtered to reduce noise in the channel compensated signal 106. The windowing filter generates the noise reduction parameters 114 that, when applied by the parameter processor 116, result in filtered windows between the path time offsets as reflected by the channel estimate. In the exemplary embodiment, filtered windows are positioned between transmission windows where the transmission windows extend ±3.5 chips from each identified signal path time offset. Accordingly, filter windows are positioned between 7 chip length transmission windows having centers at the path time offsets. As discussed below, a maximum delay filtered windows are applied outside of a maximum delay transmission window in order to reduce noise at delays significantly far from the identified signal paths.

The generated noise reduction parameters 114 result in at least partial attenuation of the channel parameters 112 within the filtered time windows when processed by the parameter processor 116. In some situations, the channel estimate 104 can be set to zero to completely attenuate the channel parameters 112 within a filtered time window. The noise reduction parameters 114 generated by windowing filter 122 may be set such that the channels parameters 112, when processed by parameter processor 116, are unchanged outside of the filtered time windows. In the exemplary embodiment, any position outside of the filtered time windows is always within ±3.5 chips from at least one of the identified signal path time offsets. In the exemplary embodiment the noise reduction parameters 114 are set such that the channel parameters are not attenuated at all outside of the filtered time windows while they are completely attenuated within the filtered time windows. Other settings of noise reduction parameters 114 are also possible, however. For example, the noise reduction parameters 114 can be set such that the channel parameters 112 are attenuated outside of the filtered time windows with an appropriate scaling factor based on the estimated parameter SNR, or the channel parameters 112 can be completely attenuated only if their amplitude falls below an appropriately selected threshold. Such thresholds can be selected, for example, to be at a certain multiple above the expected noise amplitude or at a certain fraction below the maximum channel parameter 112 amplitude or a certain fraction below the root mean squared (RMS) of the channel parameters 112 taken across all frequencies. Similar techniques, such as appropriate scaling or thresholding, can also be used in determining the noise reduction parameters 114 to be applied within the filtered time windows. In general, the scaling factor or the threshold level would be set to different values inside and outside of the filtered time windows. In the exemplary embodiment, those scaling factors were set to 0 and 1, respectively.

A parameter processor 116 combines the noise reduction parameters 114 with the channel parameters 112 to generate the channel estimate 104 that reflects the filtering of the signal path processor 110 and the equalization functions of the channel analyzer 108. The channel estimate 104 is applied by the channel compensator 101 to maximize the signal to noise ratio (SNR) of the compensated received signal 106 before further processing by the demodulator.

Figure 2:
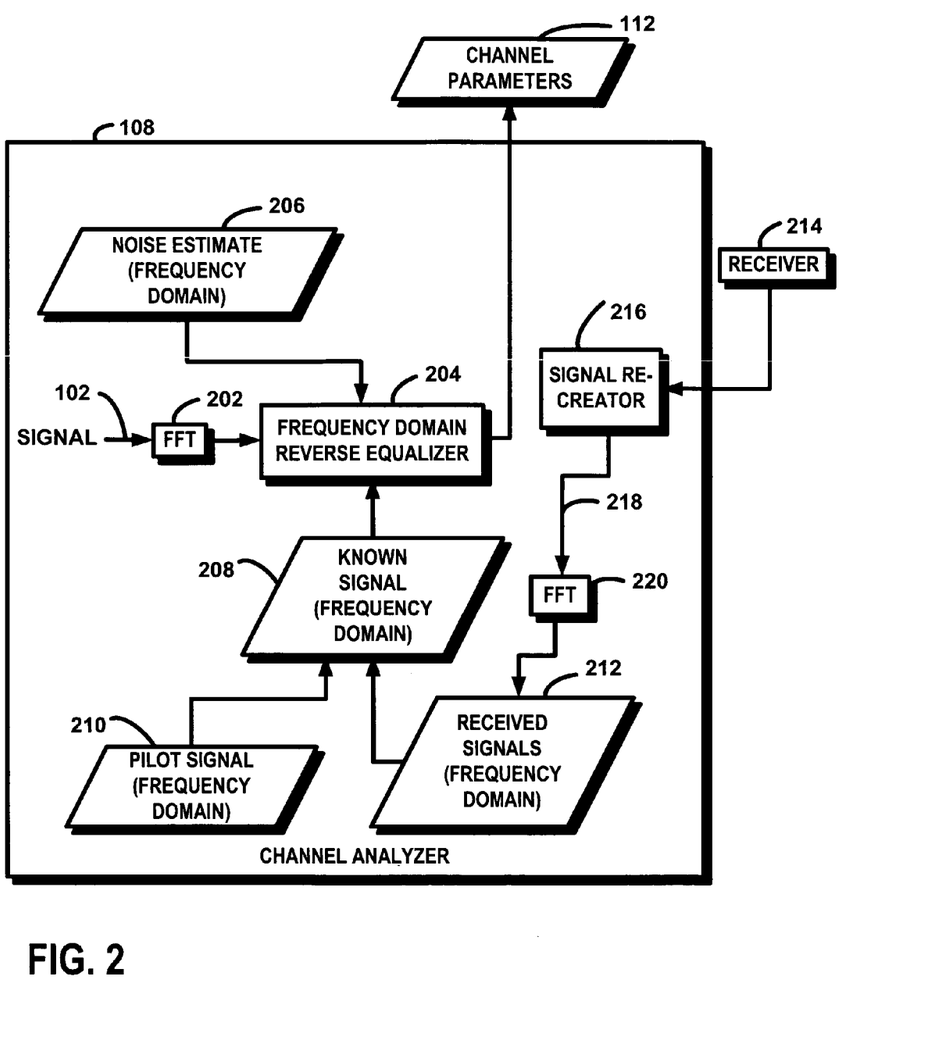
FIG. 2 is a block diagram of an exemplary channel analyzer.

FIG. 2 is a block diagram of an exemplary channel analyzer 108. As discussed above, the channel analyzer 108 may be implemented in the frequency domain or in the time domain although the response is examined in the frequency domain. For example, the Fast Fourier Transform (FFT), inverse FFT (IFFT), and the reverse equalization functions discussed with reference to FIG. 2 can be combined into a time domain implementation that performs calculations in the time domain rather than the frequency domain. In many situations, however, the computational tasks performed by a processor using a frequency domain implementation are less demanding than the computational tasks required in a time domain implementation.

The received signal 102 is transformed from a time domain representation to a frequency domain representation by a FFT processor 202. A frequency domain reverse equalizer 204 applies a revere equalization function to the frequency domain received signal to determine the channel parameters 112. The reverse equalization function is based, at least partly, on a known signal factor and a noise factor. When represented in the frequency domain, the reverse equalization function includes an inverse of a combination of the known signal factor and the noise factor. In the exemplary embodiment, the reverse equalization function is equal to:

$$\frac{K^*(f)}{|K(f)|^2 + |N|^2} \qquad (1)$$

where $K^*(f)$ is the complex conjugate of the known signal in the frequency domain as a function of frequency and N is the estimated noise spectral density. Accordingly, the known signal factor is the square of the absolute value of the known signal as a function of frequency and the noise factor is the square of the absolute value of the estimated noise. Although the estimated noise 206, N, may be a function of frequency in some situations, N is a constant in the exemplary embodiment. In the exemplary embodiment, N is determined based on RMS of differences in successively demodulated pilot symbols over a period. The difference between successively demodulated pilot symbols is calculated and the RMS of the difference values is determined over an appropriate time period. In the exemplary embodiment, that time period is 32 pilot symbols but other time periods may also be used. N is set to the calculated RMS value after scaling with an appropriate normalization factor. The normalization factor is determined based on the pilot symbol length, the signal bandwidth, the frequency resolution, and possibly on other factors in some circumstances.

The known signal 208 is a function of frequency and includes any combination of a priori signals stored in memory, such as pilot signals 210, and received signals 212 that are determined after reception by the receiver 214. Since the known signal is represented in the frequency domain when processed by the reverse equalizer 204, the pilot signal 210 is either stored as a frequency domain representation or is transformed to the frequency domain. The pilot signal representation reflects the pilot sequence as well as the spectrum representation of pulse shape.

A signal that is received and demodulated is modulated and processed in accordance with the techniques used in the base station to recreate the estimated transmitted signal corresponding to the received signal. A signal re-creator 216 modulates, spreads, scrambles and otherwise processes the signal using the same techniques in the base station to generate an estimated transmitted signal 218. The estimated transmitted signal 218 is converted to the frequency domain by a FFT processor 220 before application in the reverse equalizer 204 as part of the known signal 208.

Therefore, in the exemplary embodiment, the channel analyzer 108 applies a reverse equalizer function that, in a frequency domain representation, is equal to the complex conjugate of the known signal divided by the known signal squared plus the noise estimate squared. Accordingly, the reverse equalizer function is a minimum mean-square error (MMSE) function in the exemplary embodiment. The resulting channel parameters can be applied in a channel compensator such as DFE to maximize the signal to noise ratio (SNR) of the received signal before further processing by the receiver.

Figure 3:
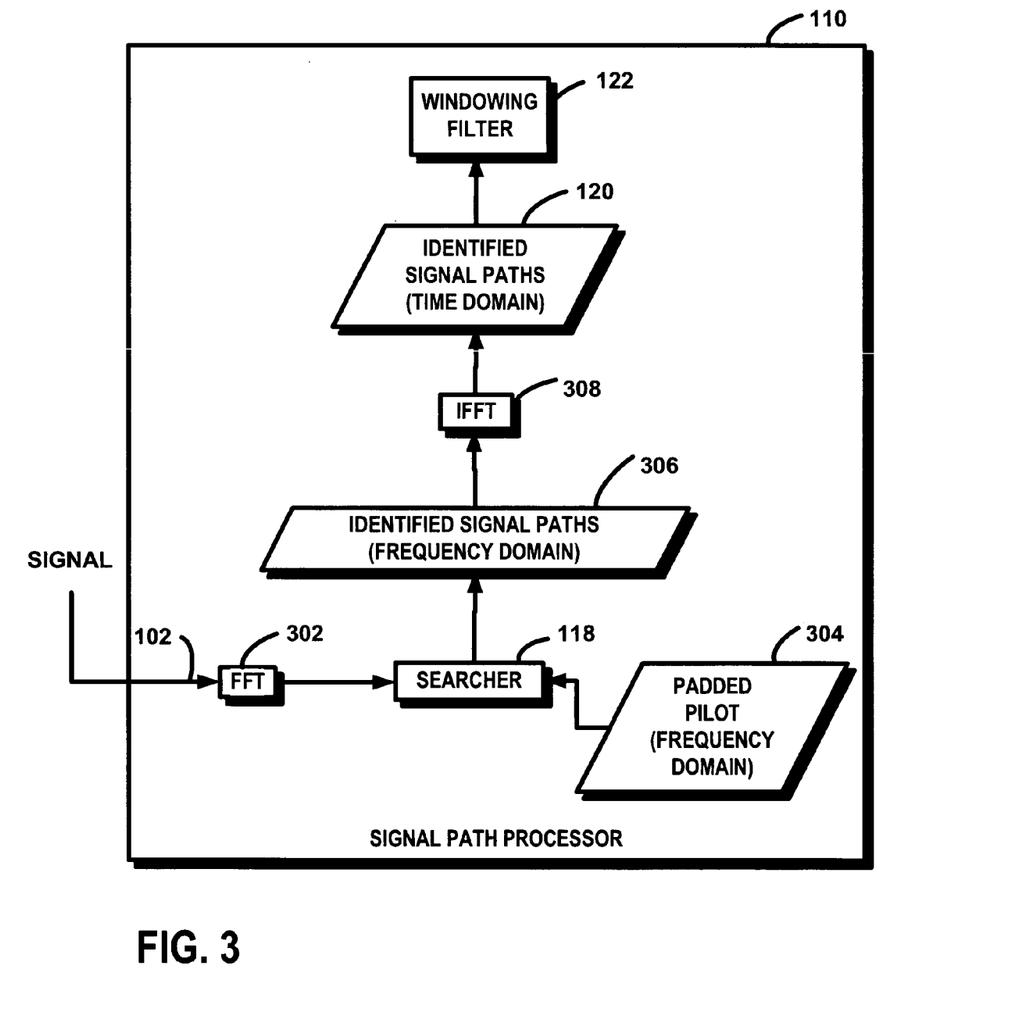
FIG. 3 is a block diagram of an exemplary signal path processor.

FIG. 3 is a block diagram of an exemplary signal path processor 110. The searcher 118 identifies time offset versions of the pilot signal that are part of the signal 102. In the exemplary embodiment, the searcher 118 processes the incoming signal 102 in the frequency domain. As a result the received signal 102 is transformed from the time domain to the frequency domain in a FFT processor 302. The searcher 118 uses a padded pilot reference signal to perform a convolution in the frequency domain. The path searcher 118 identifies a plurality of signal paths from the transmitter to the receiver system based on time shifted versions of a pilot signal received at the receiver system. An example of a time domain searcher includes a correlator that correlates the incoming data stream (received signal) with a local copy of the pseudo-random noise (PN) sequence of the pilot channel (CPICH). The pilot signal transmitted from the base station arrives at the searcher as time shifted versions of the original pilot signal. The searcher 118 determines the energy level and relative time offset of a plurality of time shifted signals to identify signal paths from the base station to the receiver system. A multiplication of two signals in the frequency domain results in a cyclic convolution in the time domain. In order to minimize errors in processing reference pilot signals with pilot sequences longer than the block lengths, the reference pilot signal is padded to allow a cyclic convolution in the frequency domain. In the exemplary embodiment, a prefix and a suffix are added to the pilot sequence. A suitable suffix and prefix includes zero padding the pilot sequence at the beginning and end of the pilot sequence.

The resulting spectrum in the frequency domain includes a representation of the identified pilot signal versions and, therefore, a representation of the signal paths in the frequency domain. The frequency domain signal paths 306 transformed from the frequency domain to the time domain by an IFFT processor 308. The time domain representations of the signal paths 120 are applied by the windowing filter 122 in the time domain to determine the appropriate filtered windows.

Figure 4:
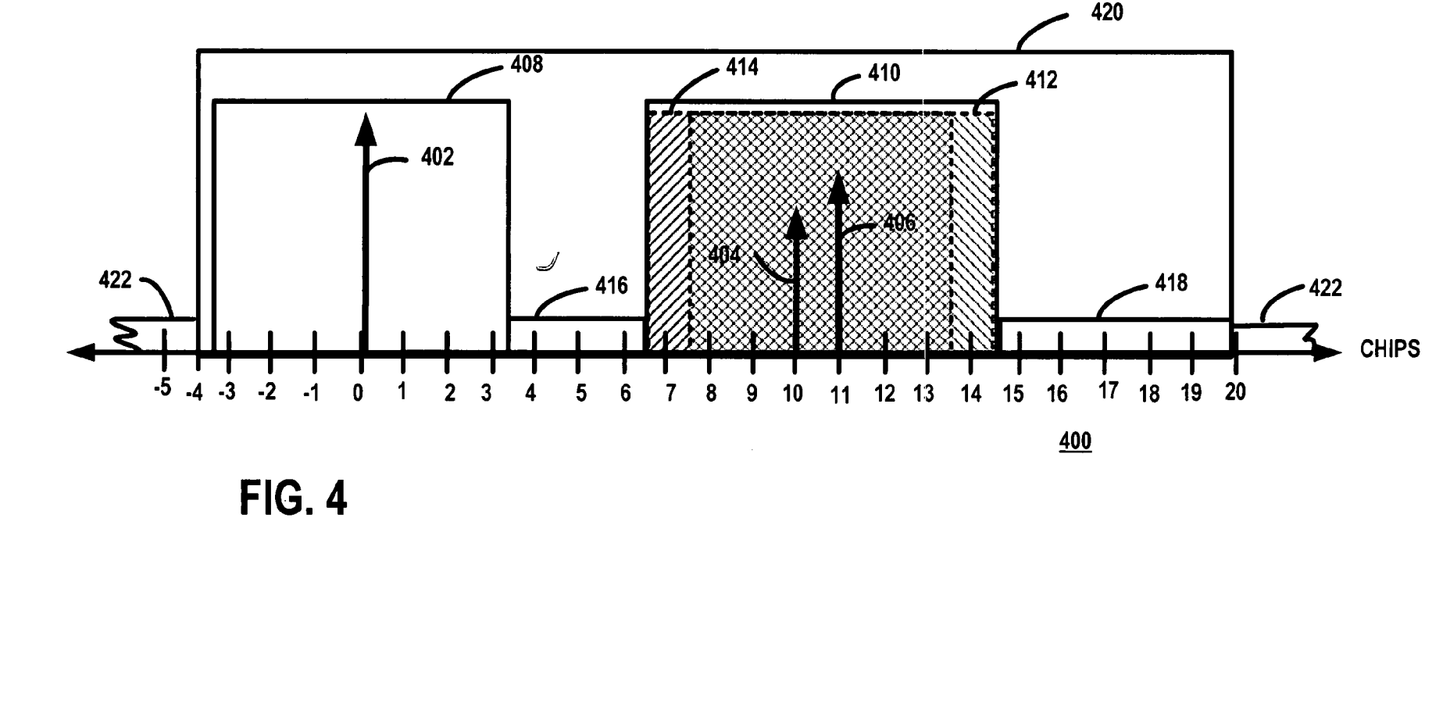
FIG. 4 is an illustration of identified signal paths within a time spectrum.

FIG. 4 is an illustration of the identified signal paths 402, 404 and 406 within a time spectrum 400. Although FIG. 4 shows three signal paths 402, 404 and 406, any number of signal paths may be identified by the searcher 118. The windowing filter 122 places transmission windows 408, 412 and 414 around identified signal paths and filtered windows 416, 418 within other delay times. In the exemplary embodiment, each of the transmission windows 408, 412, 414 has a length of 7 chips and is centered at an identified signal path. A combined transmission window 410 is formed by two overlapping transmission windows 412 and 414. Therefore, for the example illustrated in FIG. 4, a first filtered time window 416 is between 3.5 chips and 6.5 chips delay from the first identified signal path 402. A second window 418 extends from 14.5 chips to the next transmission window (not shown). The windowing filter 122 generates noise reduction parameters 114 that result in the filtered time windows 416, 418 being applied by the parameter processor 116 to the channel parameters 112. The filtered time windows 416 and 418 may completely attenuate the channel parameters 112 by setting the channel estimate 104 to zero within the time window or may apply another level of attenuation. Within transmission windows 408, 412 and 414, however, the channel estimate 104 can be set to be the same as the corresponding channel parameters 112, or other appropriately selected attenuation may be applied. The relationship between the channel parameters 112 and channel estimate 104 is determined at least partially in response to whether the channel parameter falls within the filtered time windows or within the transmission windows.

In the exemplary embodiment, maximum delay filtered windows 422 are applied outside of a maximum delay transmission window 420 in order to reduce noise at delays significantly far from the identified signal paths 402, 404, 406. A suitable maximum delay transmission window 420 extends from −4 chips to +20 chips for a system operating in accordance with CDMA2000 protocols. The maximum delay filtered windows 422 extend from the maximum delay transmission window 420 and reduce noise in regions where it is highly unlikely that a signal path exists. Although delays of 16 chips for CDMA2000 systems may be significantly long to avoid filtering signal paths, an additional 4 chips is added to avoid filtering paths where a first arriving signal may not have been detected and where a side lobe of a signal may still be detected near the edges of the maximum delay filtered windows 422.

Figure 5:
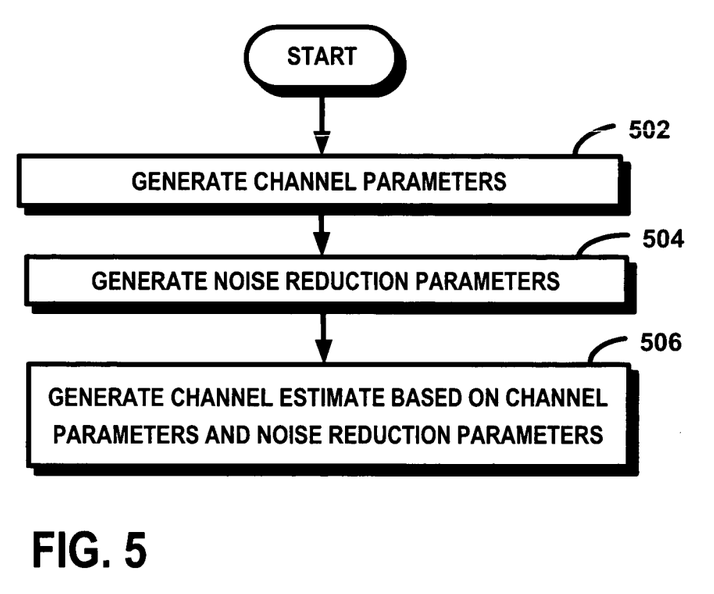
FIG. 5 is a flow chart of method of generating a channel estimate in accordance with the exemplary embodiment.

FIG. 5 is a flow chart of a method of generating a channel estimate in accordance with the exemplary embodiment of the invention. The method may be performed by any combination of hardware, software, and/or firmware. In the exemplary embodiment, the method is performed by an application specific integrated circuit (ASIC).

At step 502, channel parameters are generated. An inverse of a combination of a known signal factor as a function of frequency and a noise factor, as represented in the frequency domain, is applied to the incoming received signal. In the exemplary embodiment, the received signal is multiplied by $$\frac{K^*(f)}{|K(f)|^2 + |N|^2} \quad (1)$$

in the frequency domain. The noise estimate, N, may be a function of frequency in some circumstances.

At step 504, noise reduction parameters are generated. When applied by the parameter processor, the noise reduction parameters result in time filtered windows that at least partially attenuate the channel parameters within time windows where no signal paths have been identified. In the exemplary embodiment, the filtered time windows are positioned at time delays between the transmission windows where the time windows are established 3.5 chips before to 3.5 chips after the time delay of the identified signal path. After a searcher identifies the path time offsets 120, a windowing filter 122 determines locations and sizes of the time windows. The method described with reference to FIG. 6 below provides an example of a suitable technique for determining the path time offsets 120.

At step 506, the noise reduction parameters and channel parameters are combined to form the channel estimate. When applied by a channel compensator such as DFE or linear equalizer, the channel estimate minimizes the effects of the wireless communication channel and reduces noise by minimizing the contribution of signals within time delays that are not likely to include signal paths.

Figure 6:
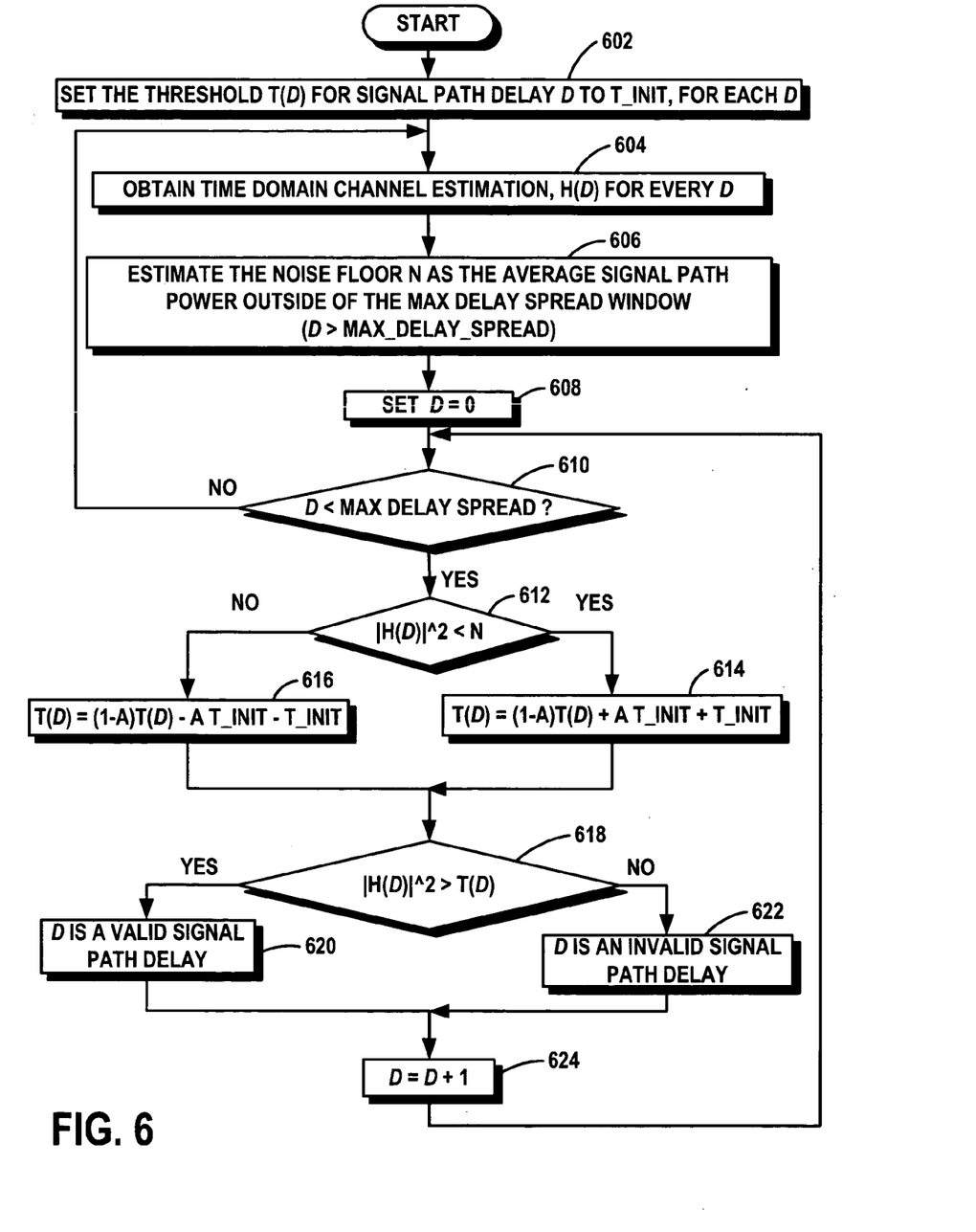
FIG. 6 is a flow chart of a method of determining signal path offsets in accordance with the exemplary embodiment.

FIG. 6 is a flow chart of a method of determining path time offsets 120 in accordance with the embodiment. Accordingly, the method described with reference to FIG. 6 provides an example of a suitable technique for determining the path time offsets 120. In the exemplary embodiment, code executed in an ASIC or processor performs the functions of the searcher to determine the path time offsets 120.

At step 602, the threshold, T(d) for signal path delay, d, is set to an initial value, T_INIT for each signal path delay. In the exemplary embodiment, d is an integer chip value and ranges from zero to a delay significantly large such that the delay is larger than a maximum delay (MAX_DELAY_SPREAD). The maximum delay (MAX_DELAY_SPREAD) is a delay where it is unlikely that a signal path exists. In systems operating in accordance with CDMA 2000, MAX_DELAY_SPREAD is set to 16 or more chips. In systems operating in accordance with WCDMA, MAX_DELAY_SPREAD is set to 48 or more chips. Other time delays and maximum delays can be used in some circumstances.

At step 604, time domain channel estimation, H(d), is received for each signal path delay. In the exemplary embodiment, the channel parameters 112 determined by the channel analyzer 108 are applied to the delays in the time domain.

At step 606, the noise floor, N, is estimated. In the exemplary embodiment, N is determined to be average power outside of the max delay spread window. Accordingly, the average noise power is determined for d, where d is greater than MAX_DELAY_SPREAD.

At step 608, D is initialized to zero (D=0).

At step 610 it is determined whether d is less than the maximum delay (MAX_DELAY_SPREAD). If d is less than the maximum delay, the method continues at step 612. Otherwise, the method returns to step 604 to receive new time domain channel estimates for each d.

At step 612, the square of the absolute value of the time domain channel estimate ($|H(d)|^2$) for d is compared to the noise estimate, N. If $|H(d)|^2<N$, the method continues at step 614. Otherwise, the method continues at step 616.

At step 614, the threshold for d is increased and at step 616, the threshold for d is decreased. In the exemplary embodiment, T(d) is set equal to (1-a)T(d)−a(T_INIT)−T_INIT at step 616 and to (1-a)T(d)+a (T_INIT)+T_INIT at step 614, where a is filter parameter constant between 0 and 1. The constant, a, is selected as compromise between speed of convergence and accuracy. As a is decreased, accuracy improves at the cost of slower convergence. Accordingly, the threshold adjustments performed by steps 612, 614 and 616 allows the threshold where a signal path was previously detected to be decreased and the threshold where no signal path was previously detected to be increased. As a result, the likelihood of detecting a false positive for a signal path is decreased and the likelihood for determining a signal path does not exist when the signal temporarily decreases in amplitude in a previously identified signal path is also decreased.

At step 618, the square of the absolute value of the time domain channel estimate ($|H(d)|^2$) for d is compared to the threshold at d, (T(d)). If $|H(d)|^2>T(d)$, the method continues at step 620 where d is determined to a valid signal path offset. Otherwise, the method continues at step 622 where d is determined to be an invalid signal path offset.

At step 624, d is incremented by 1 (d=d+1).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A channel estimator for determining channel estimate parameters indicative of characteristics of a wireless communication channel based on a received signal, the channel estimator comprising:
a module for determining a known transmitted signal and a noise signal, the channel estimator configured to apply an equalization function to the received signal, wherein the equalization function comprises a frequency domain representation with respect to an inverse of a combination of a known signal factor associated with the known transmitted signal and a noise factor associated with the noise signal, wherein the known signal factor is a function of frequency, wherein the known signal factor comprises a recreated transmitted signal that is generated using a substantially same technique that was used by a transmitting device.

2. A channel estimator in accordance with claim 1, wherein the channel estimator is further configured to apply a reverse equalization function including the combination in a denominator of a frequency domain representation of the reverse equalization function.

3. A channel estimator in accordance with claim 2, wherein the frequency domain representation of the reversed equalization function is equal to:

$$\frac{K^*(f)}{|K(f)|^2 + |N|^2},$$

where $K^*(f)$ is the complex conjugate of the known signal in the frequency domain as a function of frequency and N is an estimated noise.

4. A channel estimator in accordance with claim 3, wherein N is a function of frequency.

5. A channel estimator in accordance with claim 3, wherein N is a constant.

6. A channel estimator in accordance with claim 1, wherein the combination of the known signal factor as a function of frequency and the noise factor appears in a denominator of a frequency domain representation of the reverse equalizer function.

7. A channel estimator in accordance with claim 6, wherein the combination is equal to a sum of the known signal squared and the noise estimate squared.

8. A channel estimator in accordance with claim 7, wherein the known signal comprises a pilot channel.

9. A channel estimator in accordance with claim 8, wherein the known signal further comprises a recreated transmitted signal based on a previously received signal.

10. A channel estimator in accordance with claim 1, further comprising:
a Fast Fourier Transform (FFT) processor configured to transform the received signal from a time domain to a frequency domain; and
a frequency domain reverse equalizer configured to multiply the frequency domain received signal by the frequency domain representation inverse of the combination of the known signal factor as a function of frequency and the noise factor.

11. A channel estimator in accordance with claim 10, wherein the known signal factor is based on a known signal comprising a pilot in the frequency domain.

12. A channel estimator in accordance with claim 11, wherein the known signal comprises a recreated transmitted signal in the frequency domain based on a previously received signal.

13. A method for determining channel estimate parameters indicative of characteristics of a wireless communication channel based on a received signal, the method comprising:
determining a known transmitted signal and a noise signal; and
applying an equalization function to the received signal, wherein the equalization function comprises a frequency domain representation with respect to an inverse of a combination of a known signal factor associated with the known transmitted signal and a noise factor associated with the noise signal, wherein the known signal factor is a function of frequency, wherein the known signal factor comprises a recreated transmitted signal that is generated using a substantially same technique that was used by a transmitting device.

14. A method in accordance with claim 13, wherein the determining comprises applying a reverse equalization function including the combination in a denominator of a frequency domain representation of the reverse equalization function.

15. A method in accordance with claim 14, wherein the frequency domain representation of the reversed equalization function is equal to:

$$\frac{K^*(f)}{|K(f)|^2 + |N|^2},$$

where $K^*(f)$ is the complex conjugate of the known signal in the frequency domain as a function of frequency and N is an estimated noise.

16. A method in accordance with claim 15, wherein N is a function of frequency.

17. A method in accordance with claim 15, wherein N is a constant.

18. A method in accordance with claim 15, wherein the known signal comprises a frequency domain pilot signal.

19. A method in accordance with claim 15, wherein the known signal comprises a recreated transmitted signal corresponding to a previously received signal.

20. A channel estimator for generating a channel estimate based on channel parameters and noise reduction parameters and for application by a channel compensator to a received signal comprising a known transmitted signal and a noise signal, the channel estimator comprising:
   a channel analyzer configured to determine channel parameters indicative of characteristics of a wireless communication channel based on the received signal and configured to apply an equalization function to the received signal, wherein the equalization function comprises a frequency domain representation with respect to an inverse of a combination of a known signal factor associated with the known transmitted signal and a noise factor associated with the noise signal, wherein the known signal factor is a function of frequency, wherein the known signal factor comprises a recreated transmitted signal that is generated using a substantially same technique that was used by a transmitter;
   a signal path processor configured to generate noise reduction parameters for application to the channel parameters, the signal path processor comprising:
      a searcher configured to identify signal paths from the transmitter to the signal path processor; and
      a windowing filter configured to generate noise reduction parameters that, when applied to the channel parameters, at least partially attenuate the channel parameters within filtered time windows between the time delays of the identified signal paths.

21. A channel estimator in accordance with claim 20, wherein the channel analyzer is further configured to apply a reverse equalization function including the combination in a denominator of a frequency domain representation of the reverse equalization function.

22. A channel estimator in accordance with claim 21, wherein the frequency domain representation of the reversed equalization function is equal to:

$$\frac{K^*(f)}{|K(f)|^2 + |N|^2},$$

where $K^*(f)$ is the complex conjugate of the known signal in the frequency domain as a function of frequency and N is an estimated noise.

23. A channel estimator in accordance with claim 22, wherein N is a function of frequency.

24. A channel estimator in accordance with claim 22, wherein N is a constant.

25. A channel estimator in accordance with claim 21, wherein the combination of the known signal factor as a function of frequency and the noise factor appears in a denominator of a frequency domain representation of the reverse equalizer function.

26. A channel estimator in accordance with claim 25, wherein the combination is equal to a sum of the known signal squared and the noise estimate squared.

27. A channel estimator in accordance with claim 26, wherein the known signal comprises a pilot channel.

28. A channel estimator in accordance with claim 27, wherein the known signal further comprises a recreated transmitted signal based on a previously received signal.

29. A channel estimator in accordance with claim 21, the channel analyzer further comprising:
   a Fast Fourier Transform (FFT) processor configured to transform the received signal from a time domain to a frequency domain; and
   a frequency domain reverse equalizer configured to multiply the frequency domain received signal by the frequency domain representation inverse of the combination of the known signal factor as a function of frequency and the noise factor.

30. A channel estimator in accordance with claim 29, wherein the known signal factor is based on a known signal comprising a pilot in the frequency domain.

31. A channel estimator in accordance with claim 30, wherein the known signal comprises a recreated transmitted signal in the frequency domain based on a previously received signal.

32. A channel estimator in accordance with claim 20, wherein the noise reduction parameters result in a zero channel estimate within the filtered time windows.

33. A channel estimator in accordance with claim 20, wherein the filtered time windows are applied between transmission time windows centered at the time delays of the identified signal paths.

34. A channel estimator in accordance with claim 33, wherein the transmission time windows have a length of 7 chips.

35. A channel estimator in accordance with claim 20, the signal path processor further comprising:
   a Fast Fourier Transform (FFT) processor configured to transform the received signal from a time domain to a frequency domain;
   the searcher applying a frequency domain pilot signal to the frequency domain received signal to generate frequency domain signal paths; and
   an inverse FFT processor configured to transform the frequency domain identified signal paths to time domain identified signal paths for processing by the windowing filter.

36. A channel estimator in accordance with claim 35, wherein the frequency domain pilot signal comprises:
   a frequency domain version of a padded pilot signal.

37. A channel estimator in accordance with claim 36, wherein the padded pilot signal comprises:
   a pilot sequence; a
   a prefix sequence before the pilot sequence; and
   a suffix sequence after the pilot sequence.

38. A channel estimator in accordance with claim 37, wherein the prefix sequence comprises a plurality of zero bits and the suffix sequence comprises a plurality of zero bits.

39. A method for generating a channel estimate for application by a channel compensator, the method comprising:
   determining channel parameters indicative of characteristics of a wireless communication channel based on a received signal comprising a known transmitted signal and a noise signal, by applying, to the received signal, a frequency domain representation with respect to an inverse of a combination of a known signal factor associated with the known transmitted signal and a noise factor associated with the noise signal, wherein the known signal factor is a function of frequency; and
   generating noise reduction parameters by identifying a plurality of signal paths from a transmitter to a receiver, each signal paths having a time delay relative to a reference and generating the noise parameters that, when applied to the channel parameters, at least partially attenuate the channel parameters within filtered time windows between the time delays of the identified signal paths, wherein the identified signal paths correspond to a same transmitted signal.

40. A method in accordance with claim 39, wherein the determining comprises applying a reverse equalization function including the combination in a denominator of a frequency domain representation of the reverse equalization function.

41. A method in accordance with claim 40, wherein the frequency domain representation of the reversed equalization function is equal to:

$$\frac{K^*(f)}{|K(f)|^2 + |N|^2},$$

where $K^*(f)$ is the complex conjugate of the known signal in the frequency domain as a function of frequency and N is an estimated noise.

42. A method in accordance with claim 41, wherein N is a function of frequency.

43. A method in accordance with claim 41, wherein N is constant.

44. An apparatus for determining channel estimate parameters indicative of characteristics of a wireless communication channel based on a received signal, comprising:
   means for determining a known transmitted signal and a noise signal; and
   means for applying an equalization function to the received signal, wherein the equalization function comprises a frequency domain representation with respect to an inverse of a combination of a known signal factor associated with the known transmitted signal and a noise factor associated with the noise signal, wherein the known signal factor is a function of frequency, wherein the known signal factor comprises a recreated transmitted signal that is generated using a substantially same technique that was used by a transmitting device.

45. The apparatus of claim 44, wherein the means for determining comprises means for applying a reverse equalization function including the combination in a denominator of a frequency domain representation of the reverse equalization function.

46. The apparatus of claim 45, wherein the frequency domain representation of the reversed equalization function is equal to:

$$\frac{K^*(f)}{|K(f)|^2 + |N|^2},$$

where $K^*(f)$ is the complex conjugate of the known signal in the frequency domain as a function of frequency and N is an estimated noise.

47. The apparatus of claim 46, wherein N is a function of frequency.

48. The apparatus of claim 46, wherein N is a constant.

49. The apparatus of claim 46, wherein the known signal comprises a frequency domain pilot signal.

50. The apparatus of claim 46, wherein the known signal comprises a recreated transmitted signal corresponding to a previously received signal.

51. A computer program product for determining channel estimate parameters indicative of characteristics of a wireless communication channel based on a received signal, comprising:
   a non-transitory computer-readable medium comprising code for:
      determining a known transmitted signal and a noise signal; and
      applying an equalization function to the received signal, wherein the equalization function comprises a frequency domain representation with respect to an inverse of a combination of a known signal factor associated with the known transmitted signal and a noise factor associated with the noise signal, wherein the known signal factor is a function of frequency, wherein the known signal factor comprises a recreated transmitted signal that is generated using a substantially same technique that was used by a transmitting device.

52. The computer program product of claim 51, wherein the code for determining comprises code for applying a reverse equalization function including the combination in a denominator of a frequency domain representation of the reverse equalization function.

53. The computer program product of claim 52, wherein the frequency domain representation of the reversed equalization function is equal to:

$$\frac{K^*(f)}{|K(f)|^2 + |N|^2},$$

where $K^*(f)$ is the complex conjugate of the known signal in the frequency domain as a function of frequency and N is an estimated noise.

54. The computer program product of claim 53, wherein N is a function of frequency.

55. The computer program product of claim 53, wherein N is a constant.

56. The computer program product of claim 53, wherein the known signal comprises a frequency domain pilot signal.

57. The computer program product of claim claim 53, wherein the known signal comprises a recreated transmitted signal corresponding to a previously received signal.

58. An apparatus for generating a channel estimate for application by a channel compensator, comprising:
   means for determining channel parameters indicative of characteristics of a wireless communication channel based on a received signal comprising a known transmitted signal and a noise signal, by applying, to the received signal, a frequency domain representation with respect to an inverse of a combination of a known signal factor associated with the known transmitted signal and a noise factor associated with the noise signal, wherein the known signal factor is a function of frequency; and
   means for generating noise reduction parameters by identifying a plurality of signal paths from a transmitter to a receiver, each signal paths having a time delay relative to a reference and generating the noise parameters that, when applied to the channel parameters, at least partially attenuate the channel parameters within filtered time windows between the time delays of the identified signal paths, wherein the identified signal paths correspond to a same transmitted signal.

59. The apparatus of claim 58, wherein the means for determining comprises means for applying a reverse equalization function including the combination in a denominator of a frequency domain representation of the reverse equalization function.

60. The apparatus of claim 59, wherein the frequency domain representation of the reversed equalization function is equal to:

$$\frac{K^*(f)}{|K(f)|^2 + |N|^2},$$

where K*(f) is the complex conjugate of the known signal in the frequency domain as a function of frequency and N is an estimated noise.

61. The apparatus of claim 60, wherein N is a function of frequency.

62. The apparatus of claim 60, wherein N is constant.

63. A computer program product for generating a channel estimate for application by a channel compensator, comprising:
   a non-transitory computer-readable medium comprising code for:
      determining channel parameters indicative of characteristics of a wireless communication channel based on a received signal comprising a known transmitted signal and a noise signal, by applying, to the received signal, a frequency domain representation with respect to an inverse of a combination of a known signal factor associated with the known transmitted signal and a noise factor associated with the noise signal, wherein the known signal factor is a function of frequency; and
      generating noise reduction parameters by identifying a plurality of signal paths from a transmitter to a receiver, each signal paths having a time delay relative to a reference and generating the noise parameters that, when applied to the channel parameters, at least partially attenuate the channel parameters within filtered time windows between the time delays of the identified signal paths, wherein the identified signal paths correspond to a same transmitted signal.

64. The computer program product of claim 63, wherein the code for determining comprises code for applying a reverse equalization function including the combination in a denominator of a frequency domain representation of the reverse equalization function.

65. The computer program product of claim 64, wherein the frequency domain representation of the reversed equalization function is equal to:

$$\frac{K^*(f)}{|K(f)|^2 + |N|^2},$$

where K*(f) is the complex conjugate of the known signal in the frequency domain as a function of frequency and N is an estimated noise.

66. The computer program product of claim 65, wherein N is a function of frequency.

67. The computer program product of claim 65, wherein N is constant.

* * * * *